United States Patent
Sinha et al.

[11] Patent Number: 5,917,858
[45] Date of Patent: *Jun. 29, 1999

[54] DIGITAL TRANSMISSION SYSTEM WITH SYMBOL ENCODING WHICH MAXIMIZES THE SIGNAL AMPLITUDE-TO-NOISE RATIO

[75] Inventors: Atul N. Sinha; Augustus J. E. M. Janssen, both of Eindhoven, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/757,524

[22] Filed: Nov. 27, 1996

[30] Foreign Application Priority Data

Nov. 29, 1995 [EP] European Pat. Off. ............ 95203288

[51] Int. Cl.⁶ ..................................... H04B 1/10
[52] U.S. Cl. ...................... 375/254; 375/285; 375/296; 375/346
[58] Field of Search ..................... 375/239, 254, 375/285, 296, 316, 346, 350; 341/107, 109; 370/202, 213

[56] References Cited

U.S. PATENT DOCUMENTS

| | | | |
|---|---|---|---|
| 4,928,318 | 5/1990 | Ibe et al. ................................. | 359/184 |
| 5,062,152 | 10/1991 | Faulkner ................................. | 359/185 |
| 5,493,587 | 2/1996 | Sandri et al. ........................... | 375/285 |
| 5,541,964 | 7/1996 | Cohen et al. ........................... | 375/285 |
| 5,587,830 | 12/1996 | Chraplyvy et al. ..................... | 359/341 |
| 5,600,473 | 2/1997 | Huber ...................................... | 359/179 |
| 5,608,760 | 3/1997 | Sandri et al. ........................... | 375/285 |

OTHER PUBLICATIONS

Newton, H., Newton's Telecom Dictionary, 8th Edition. New York: Flatiron Publishing, Inc., p. 165, 1994.

"Coding to Increase Number of Channels in QAM–SC–M–IM/DD Lightwave System" by J.H Wu, Y.H. Lee and J. Wu in Electronic Letters, Jan. 2, 1993, vol. 28, No. 1, pp. 65–67.

*Primary Examiner*—Don N. Vo
*Attorney, Agent, or Firm*—Leroy Eason

[57] ABSTRACT

A transmission system wherein a plurality of digital signals are coded and the coded signals are used to amplitude modulate respective carrier waves. The amplitude modulated coded signals are then combined for conveyance over a non-linear transmission medium. Due to the transmission non-linearity there will be distortion of the received combined signal, thereby reducing the transmission capacity of the system. In order to increase the transmission capacity, coding of the digital signals is carried out in accordance with a code such that the amplitude of the modulated carrier for digital symbols of higher probability is reduced in relation to the amplitude thereof for digital symbols of lower probability of occurrence.

4 Claims, 3 Drawing Sheets

DIGITAL TRANSMISSION SYSTEM WITH SYMBOL ENCODING WHICH MAXIMIZES THE SIGNAL AMPLITUDE-TO-NOISE RATIO

BACKGROUND OF THE INVENTION

1. Field of the Invention

The present invention relates to a transmission system having a transmitter comprising coding means for deriving from a plurality of sequences of digital symbols a plurality of sequences of coded digital symbols, modulation means for deriving from said plurality of sequences of coded digital symbols a plurality of digitally modulated carrier signals, and combining means for deriving a combined signal from said plurality of digitally modulated carrier signals. The transmitter is arranged for transmitting said combined signal over a non linear transmission medium to a receiver. The receiver comprises demodulation means for deriving at least one sequence of coded symbols from the received signal, and decoding means for deriving a sequence of digital symbols from said sequence of digital symbols.

The present invention also relates to a transmitter, a coder/demodulator, a receiver and a signal for use in such a system.

2. Description of the Related Art

A transmission system according to the preamble is known from "Coding to increase number of channels in QAM-SCM-IM/DD lightwave system" by J. H. Wu, Y. H. Lee and J. Wu in Electronic letters, $2^{nd}$ January 1992, Vol. 28, No. 1, pp.65 . . . 67.

Such transmission systems can find their application in all kinds of transmission networks having a non linear transmission medium.

A first example of such a transmission system is an optical transmission system. The transmission system is here regarded to comprise an electro-optical converter, e.g., a laser, an optical transmission path such as an optical fibre or free space, and an opto electrical converter such as a photo diode. In common optical transmission systems the non-linearity of the system is mainly caused by the electro-optical converter, but it is also possible that substantial non-linearity is caused by optical amplifiers present in the transmission path.

A second example of a transmission system according to the preamble is a cable transmission network such as a CATV network. Here the non-linearity is mainly caused by the non linearity of the amplifiers used at several places in the network.

In transmission networks it is often desired to transmit a plurality of sequences of digital symbols. Each of said sequences of digital symbols represents, e.g., a separate (HD)TV program or a data service. In the known transmission system each such sequence is coded to obtain a sequence of coded digital symbols. Subsequently the sequence of coded digital symbols is modulated on a proper carrier to obtain a modulated carrier signal. Finally, the different carrier signals are combined to form a combined signal which is transmitted via the transmission medium. In the receiver at least one of the modulated carrier signals is selected, demodulated and decoded to obtain the desired sequence of digital symbols.

Due to the non-linearity of the transmission medium the combined signal will undergo some non-linear distortion, resulting in the generation of harmonics and intermodulation products. The presence of such distortion products will cause some interference to the desired signals leading to an increased error probability.

In the known transmission system the sequences of digital symbols are coded using a (255,239) BCH error correcting code to reduce the error probability of the received digital symbols. Due to the use of such an error correcting code, more distortion can be tolerated, and consequently larger signal amplitudes of the combined signal can be tolerated. This leads to an increased capacity of the transmission system. However the desire to increase the capacity of the transmission system even more still exists.

SUMMARY OF THE INVENTION

The object of the present invention is to provide a transmission system according to the preamble having an increased capacity.

Therefor the transmission system according to the invention is characterised in that the coding means are arranged for deriving sequences of coded digital symbols such that the larger the probability of a coded symbol is, the lower is the amplitude of the modulated signals corresponding to said coded symbol.

The present invention is based on the recognition that transmission of symbols corresponding to a modulated carrier signal with a large amplitude causes most of the non-linear distortion. By reducing the probability of said symbols, the average distortion introduced by all the carriers will decrease, and consequently the error probability will decrease too. This allows the use of still larger amplitudes and leads thereby to a larger capacity of the transmission system.

A first embodiment of the invention is characterised in that the non linear transmission medium comprises a cascade connection of an electro-optical converter, an optical transmission channel, and an opto-electrical converter.

In an optical transmission system the non-linearity is mainly caused by clipping of the negative signal excursions of the combined signal due to a limited bias current of the laser diode. The non-linear distortion is therefore often called "clipping noise". However, it is also possible that some saturation occurs at the positive excursions of the combined signal.

A second embodiment of the invention is characterised in that the non-linear transmission medium comprises a plurality of channel sections which are interconnected via at least one amplifier.

In a transmission system in which amplifiers are the main cause of distortion the distortion will both occur at positive and negative excursions of the combined signal.

BRIEF DESCRIPTION OF THE DRAWINGS

The invention will now be explained in more detail with reference to the drawings, wherein.

DETAILED DESCRIPTION OF THE PREFERRED EMBODIMENTS

Figure 1:
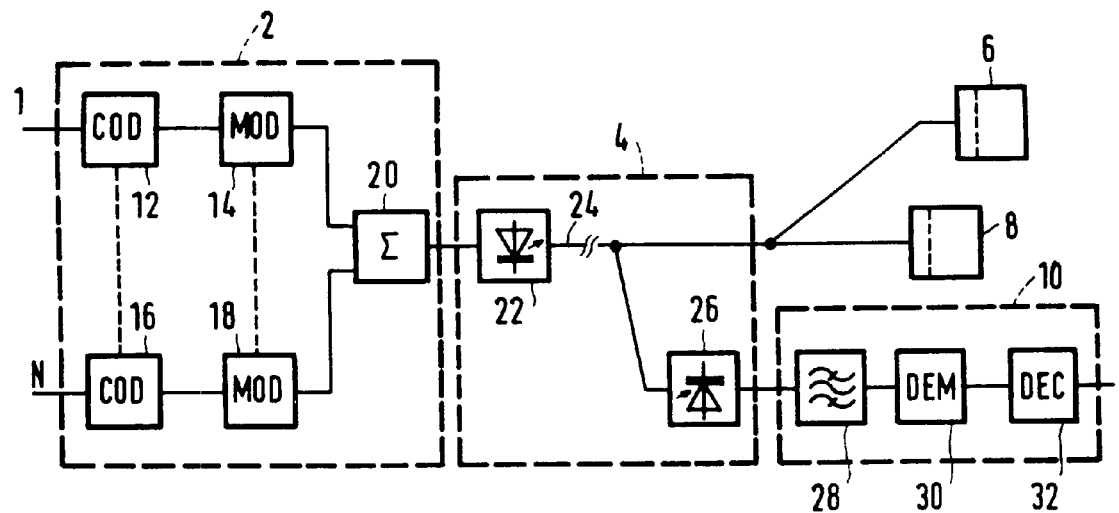
FIG. 1 is a transmission system according to the invention.

In transmitter 2 in FIG. 1 a plurality of sequences of digital symbols are applied to inputs of the coding means, being here coders 12 . . . 16. An output of each of the coders 12 . . . 16 is connected to an input of a respective modulation means, being here modulators 14 . . . 18. The outputs of the modulators 14 . . . 18 are connected to inputs of combining means 20.

The output of the combining means 20 is connected to the input of a transmission medium 4. The input of the transmission medium is constituted by an input of an electro-optical converter 22. The output of the electro-optical converter 22 is connected to an input of a fibre network 24. A plurality of outputs of the fibre network 24 are connected to an input of opto-electric converters. One of these converters is explicitly shown as converter 26. The outputs of the transmission medium 4 are constituted by the outputs of the opto-electrical converters.

In the receiver 10, the input is connected to a selector 28. The output of the selector 28 is connected to an input of a demodulator 30. The output of the demodulator 30 is connected to an input of the decoder 32. At the output of the decoder 32 the reconstructed sequence of digital symbols is available.

In the transmission system according to FIG. 1, N sequences of digital symbols are converted into N sequences of coded digital symbols by the coders 12 . . . 16. Each of the sequences of digital symbols can represent an audio, video or data signal. In each of the modulators 14 . . . 18 a digitally modulated carrier signal is obtained by modulating a carrier signal at least in amplitude. Suitable modulation methods are, e.g., ASK (Amplitude Shift Keying) and QAM (Quadrature Amplitude Modulation).

The modulated carrier signals are combined in an adder 20. The output of the adder 20, carrying the combined signal, is connected to the non-linear transmission medium. The non-linearity is caused by the laser 22, mainly due to the negative excursions of the combined signal. If the bias current of the laser 22 is equal to $I_b$, the amplitude $I_c$ of the current representing the combined signal should be smaller than $I_b$ for distortion free transmission. The modulation index $m=I_c/I_b$ should be consequently smaller than 1. If the combined signal comprises N modulated carriers the modulation index $m_i$ of each modulated carrier signal is limited to 1/N (if $m_i$ is equal for all carriers) for distortion free transmission. Tolerating some distortion by letting $m_i>1/N$ can result in an increase of the transmission capacity of the transmission system. The optical output power $P_{opt}$ of the laser diode 22 can be written:

$$P_{opt} = C \cdot I_{laser} = C \cdot MAX[(I_b+I_c), I_{th}] \quad (1)$$

In (1) C is a proportionality constant, $I_{th}$ is the threshold current of the laser diode 22, and MAX[x,y] is the maximum value from the values x and y. The current $I_c$ can be written:

$$I_c = I_b \cdot \sum_{i=1}^{N} a_{i,j} \cdot m_i \cdot \sin(\omega_i t) \quad (2)$$

In (2) $a_{i,j}$ is the normalised amplitude of the modulated $i^{th}$ carrier corresponding to the $j^{th}$ symbol. For the optical power $P_{opt}$ of the laser diode 22 can now be written:

$$P_{opt} = C \cdot I_b \cdot MAX\left[1 + \sum_{i=1}^{n} a_{k,i} \cdot m_i \cdot \sin(\omega_i t), \frac{I_{th}}{I_b}\right] \quad (3)$$

The output signal of the laser 22 is distributed via the fibre network 24 to a plurality of sub-stations 6, . . . , 8 and 10. In the sub-station 10, the output signal of the transmission medium 4 is available at the output of the opto-electrical converter 26. The frequency selector 28 selects one of the modulated carrier signals for demodulation. The selector 28 can comprise a tunable bandfilter, but it is also possible that the selection is made by converting the input signal to a lower IF frequency by mixing it with a local oscillator signal with adjustable frequency.

The opto-electrical converter 26 generates an electric signal which is essentially proportional to the power of the received optical signal.

Besides the desired electrical signal also some undesired components are present in the output signal of the opto-electrical converter. The non linear distortion of the transmission network generates harmonic components and inter-modulation products. Besides the noise like signal caused by the non linear transmission medium three other noise components are present at the input of the receiver. A first one is the so called Relative Intensity Noise (RIN) which is generated in the electro-optical converter, and which has a constant level at the output of the electro-optical converter. At the input of the receiver it is inversely proportional to the attenuation of the optical fibre. A second and a third noise component are the noise of the electrical-optical converter and the noise caused by the electronic circuitry. The noise of the opto-electronic converter is proportional to the received optical signal, and the noise of the electronic circuitry is under normal circumstances constant.

For the amplitude to noise ratio one can write:

$$ANR = \frac{A}{\sqrt{N_{RIN} + N_{SHOT} + N_{REC} + N_{CLIP}}} \quad (4)$$

In (4) A is the amplitude of the modulated carrier signal, $N_{RIN}$ is the relative intensity noise, $N_{SHOT}$ is the shot noise of the opto-electrical converter, $N_{REC}$ is the receiver noise and $N_{CLIP}$ is the clipping noise due to the non-linear transmission medium. $N_{RIN}$, $N_{SHOT}$ and $N_{REC}$ are independent of the modulation index $m_i$. A increases proportional with index $m_i$ and $N_{CLIP}$ increases more than proportionally with $m_i$. In this situation there is a value of $m_i$ leading to a maximum value of ANR, and consequently to a maximum value of the channel capacity. By using a channel code in which the probability of symbols decreases with an increasing amplitude of the modulated carrier signal associated with it, the average signal amplitude is decreased.

By reducing the average value of the amplitude of the modulated carrier signals by choosing a different channel code, a larger value of $m_i$ can be tolerated at a given value of the clipping noise. This results in an increased value of the maximum amplitude to noise ratio.

This means that the number of carriers and/or the number of signal levels of the modulation scheme can be increased.

The modulated carrier signal available at the output of the selector 28 is demodulated by the demodulator 30. The signal at the output of the demodulator 30 is the demodulated sequence of coded digital symbols. This sequence is decoded by the decoder 32. At the output of the decoder 32 the sequence of digital symbols is available.

Figure 2:
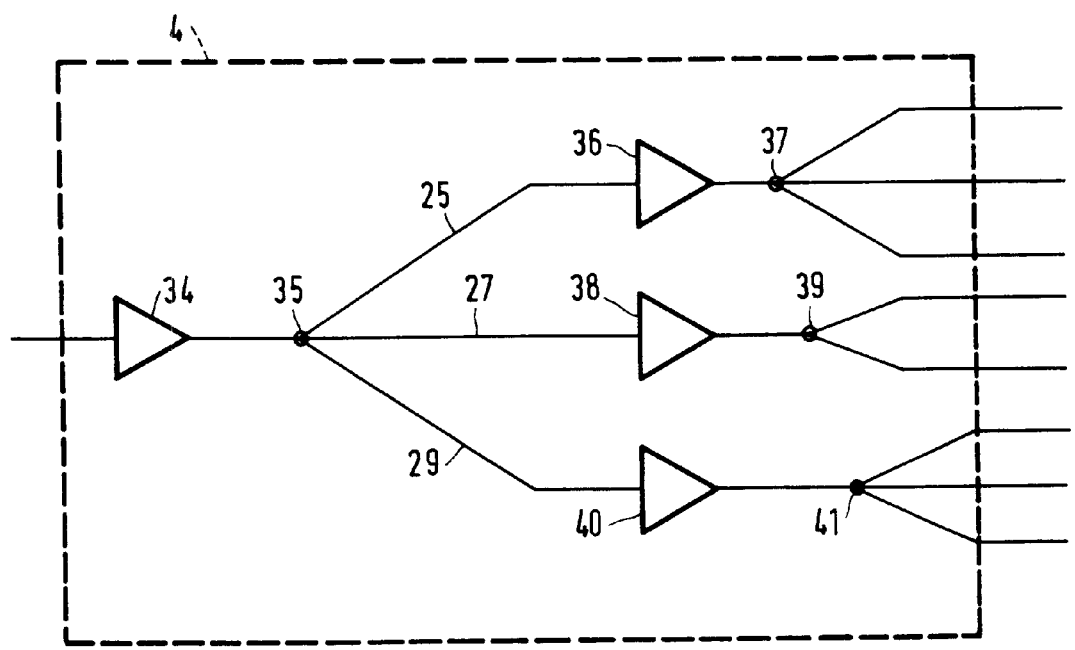
FIG. 2 shows an alternative transmission medium for the transmission medium 4 in FIG. 1.

In the transmission medium 4 according to FIG. 2 the input is connected to the input of an amplifier 34. The output of the amplifier 34 is connected to an input of a power splitter 35. A first output of the power splitter 35 is connected to an input of an amplifier 36 via a cable section 25. A second output of the power splitter 35 is connected to an input of an amplifier 38 via a cable section 27. A third output of the power splitter 35 is connected to an input of an amplifier 40 via a cable section 29. The output of the amplifier 36 is connected to an input of a power splitter 37. Three outputs of the power splitter 37 are connected to drop sections for secondary stations. The output of the amplifier 38 is connected to an input of a power splitter 39. Two outputs of the power splitter 39 are connected to drop sections for secondary stations. The output of the amplifier 40 is connected to the input of a power splitter 41. Three outputs of the power splitter 41 are connected to drop sections for secondary stations.

A non linear transmission medium according to FIG. 2 is used, for example, in CATV systems. The non linearity is caused by the amplifiers 34, 36, 38 and 40. The gain of the amplifier 34 has been chosen to compensate the attenuation due to the splitting by the power splitter 35 and the loss in the cable sections 25, 27 and 29. The gain of the amplifiers 36, 38 and 40 is chosen to compensate for the attenuation due to the splitting by the power splitters 37, 39 and 41 respectively and the loss in the corresponding drop section.

Figure 3:
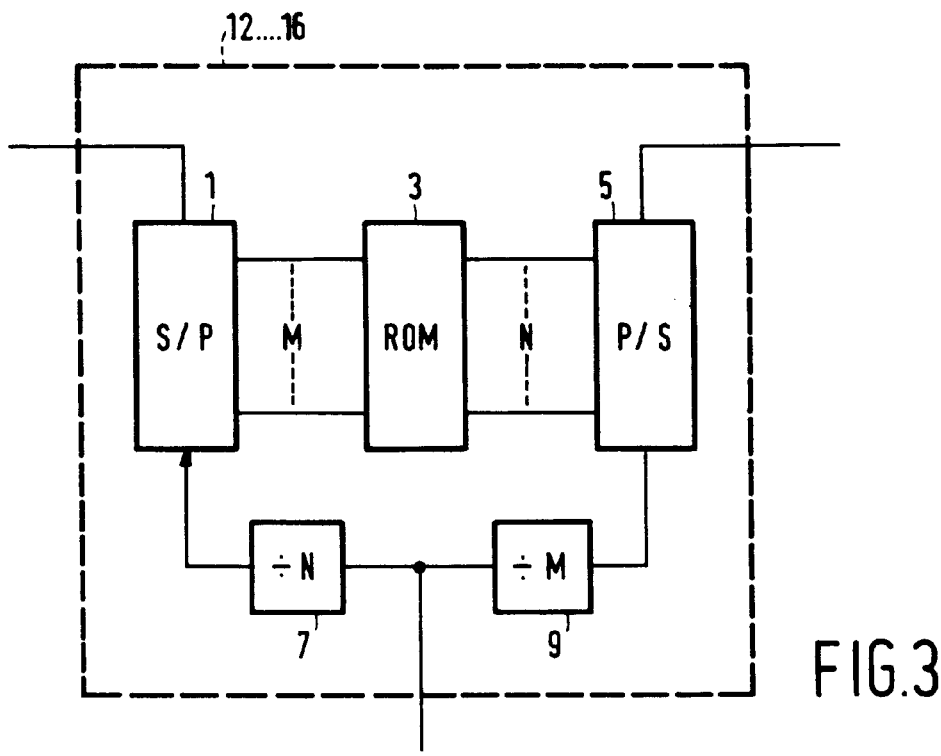
FIG. 3 is an embodiment of the coders and decoders used in a transmission system according to the invention.

The coders 12 . . . 16 in FIG. 1 may be as shown in FIG. 3. Therein the coder input is connected to an input of a series to parallel converter 1. M outputs of the series to parallel converter are connected to M inputs of a read only memory 3. N outputs of the read only memory 3 are connected to a parallel to series converter 5. The output of the parallel to series converter 5 constitutes the output of the coder.

A clock input of the coder is connected to an input of a frequency divider 7 with a division factor N, and also to an input of frequency divider 9 with a division factor M. The output of the frequency divider 7 is connected to a clock input of the series to parallel converter 1. The output of the frequency divider 9 is connected to a clock input of the parallel to series converter 5.

In case binary amplitude shift keying is used, the coder generates in response to a sequence of binary symbols having P(1) and P(0) each equal to 0.5 a sequence of binary symbols having P(1)<0.5 and having P(0)>0.5.

In order to be able to transmit the same amount of data after being encoded, the symbol rate of the sequence of coded symbols has to be increased. The channel rate $R_{CH}$ has to be at least equal to $$R_{ch} = \frac{R_{source}}{H_{CC}} \quad (5)$$

In (5) $R_{source}$ is the symbol rate of the source, and $H_{CC}$ is the entropy of the channel code. For $H_{CC}$ one can write $$H_{CC} = -P(1) \cdot \log_2 P(1) - P(0) \cdot \log_2 P(0) \quad (6)$$

In the coder according to FIG. 3 the ratio between the channel rate $R_{CH}$ and the source rate $R_{source}$ is equal to N/M. If it is assumed that the clock signal at the input of the frequency dividers 7 and 9 has a frequency fr, the output signal of the frequency divider 7 has a frequency $f_r/N$ and the output signal of the frequency divider 9 has a frequency of $f_r/M$. Using the output signal of frequency divider 7, M source symbols are clocked into the series to parallel converter during a period of $M \cdot N/f_r$. These symbols are subsequently applied to the ROM 3.

The ROM 3 provides N coded symbols in response to the M input symbols. These coded symbols are transferred to the parallel-series converter 5. The coded symbols are converted into a serial stream with symbol rate $f_r/M$ by clocking the parallel-series converter 5 with the clock signal with frequency $f_r/M$ provided by the frequency divider 9. Consequently in the period $N \cdot M/f_r$ N symbols are serially transmitted by the coder.

A first useful code is one which converts 3 input bits $a_i$ into 8 output bits b, as follows:

| $a_2$ | $a_1$ | $a_0$ | $b_7$ | $b_6$ | $b_5$ | $b_4$ | $b_3$ | $b_2$ | $b_1$ | $b_0$ |
|---|---|---|---|---|---|---|---|---|---|---|
| 0 | 0 | 0 | 1 | 0 | 0 | 0 | 0 | 0 | 0 | 0 |
| 0 | 0 | 1 | 0 | 1 | 0 | 0 | 0 | 0 | 0 | 0 |
| 0 | 1 | 0 | 0 | 0 | 1 | 0 | 0 | 0 | 0 | 0 |
| 0 | 1 | 1 | 0 | 0 | 0 | 1 | 0 | 0 | 0 | 0 |
| 1 | 0 | 0 | 0 | 0 | 0 | 0 | 1 | 0 | 0 | 0 |
| 1 | 0 | 1 | 0 | 0 | 0 | 0 | 0 | 1 | 0 | 0 |
| 1 | 1 | 0 | 0 | 0 | 0 | 0 | 0 | 0 | 1 | 0 |
| 1 | 1 | 1 | 0 | 0 | 0 | 0 | 0 | 0 | 0 | 1 |

This code, also referred to as pulse position modulation, has a rate of 8/3 times the rate of the input code. The probability of symbol value 1 is equal to ⅛. If the logical value of "1" corresponds to the amplitude value of the modulated carrier signal being higher than the amplitude value corresponding to logical value "0", this results in a decrease of the average power of the modulated carrier signal.

A further code which can be used with the present invention is given in the table below:

| $a_2$ | $a_1$ | $a_0$ | $b_3$ | $b_2$ | $b_1$ | $b_0$ |
|---|---|---|---|---|---|---|
| 0 | 0 | 0 | 0 | 0 | 0 | 0 |
| 0 | 0 | 1 | 0 | 0 | 0 | 1 |
| 0 | 1 | 0 | 0 | 0 | 1 | 0 |
| 0 | 1 | 1 | 0 | 1 | 0 | 0 |
| 1 | 0 | 0 | 1 | 0 | 0 | 0 |
| 1 | 0 | 1 | 1 | 0 | 1 | 0 |
| 1 | 1 | 0 | 0 | 1 | 0 | 1 |
| 1 | 1 | 1 | 0 | 0 | 1 | 1 |

3 bits $a_i$ are converted into 4 bits $b_j$. The rate of the coded symbols is 4/3 times the rate of the uncoded symbols. The probability of symbol value 1 is equal to 5/16.

Figure 4:
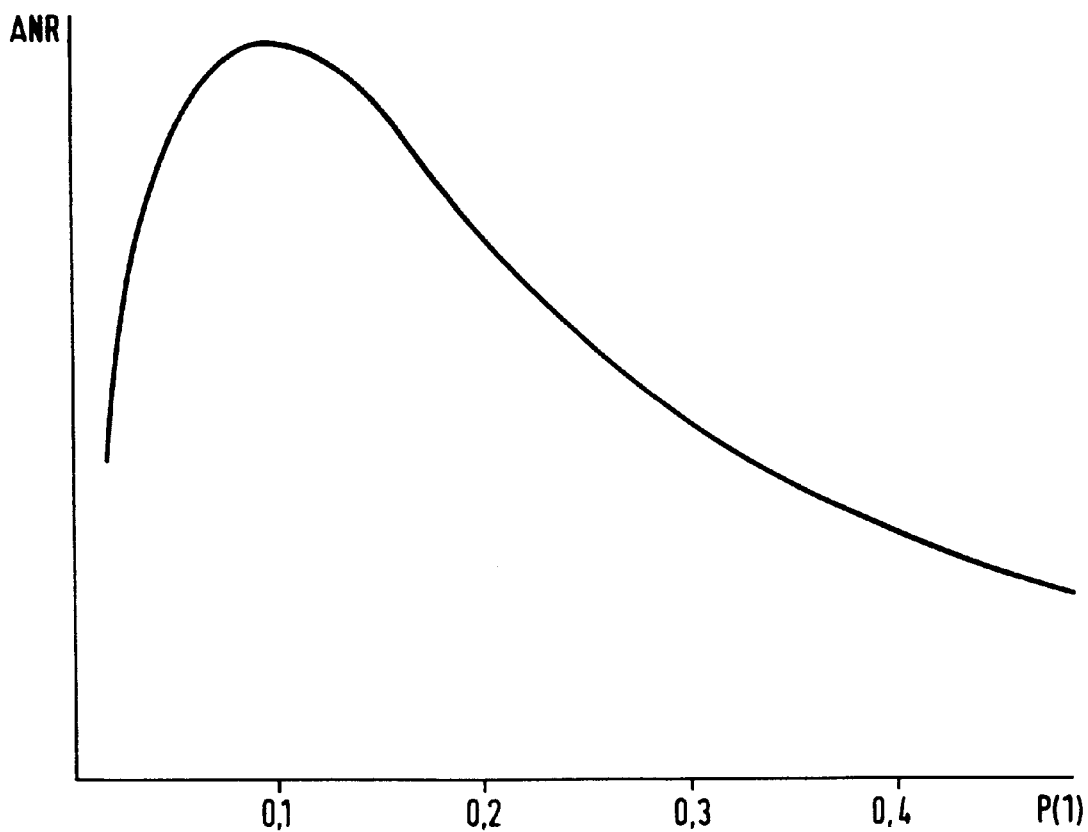
FIG. 4 shows the amplitude to noise ratio at the receiver as function of the probability of the digital symbols having value "1" in a transmission system according to the invention.

FIG. 4 shows the amplitude to noise ratio as a function of the probability of logical value "1". It is assumed that ASK modulation of the carrier is used. Further it is assumed that there are 64 carriers modulated with 2 Mbit/sec streams. It is further assumed that the output power of the electro-optical converter is 0 dBm and the attenuation (including splitting loss) of the fiber network is 34.4 dB. It is also assumed that the RIN can be neglected, $m_i$ is equal to 0.4 and that the value of the noise current $I_n^2$ at the output of the opto-electrical converter is equal to 4 pA$^2$/Hz.

Figure 5:
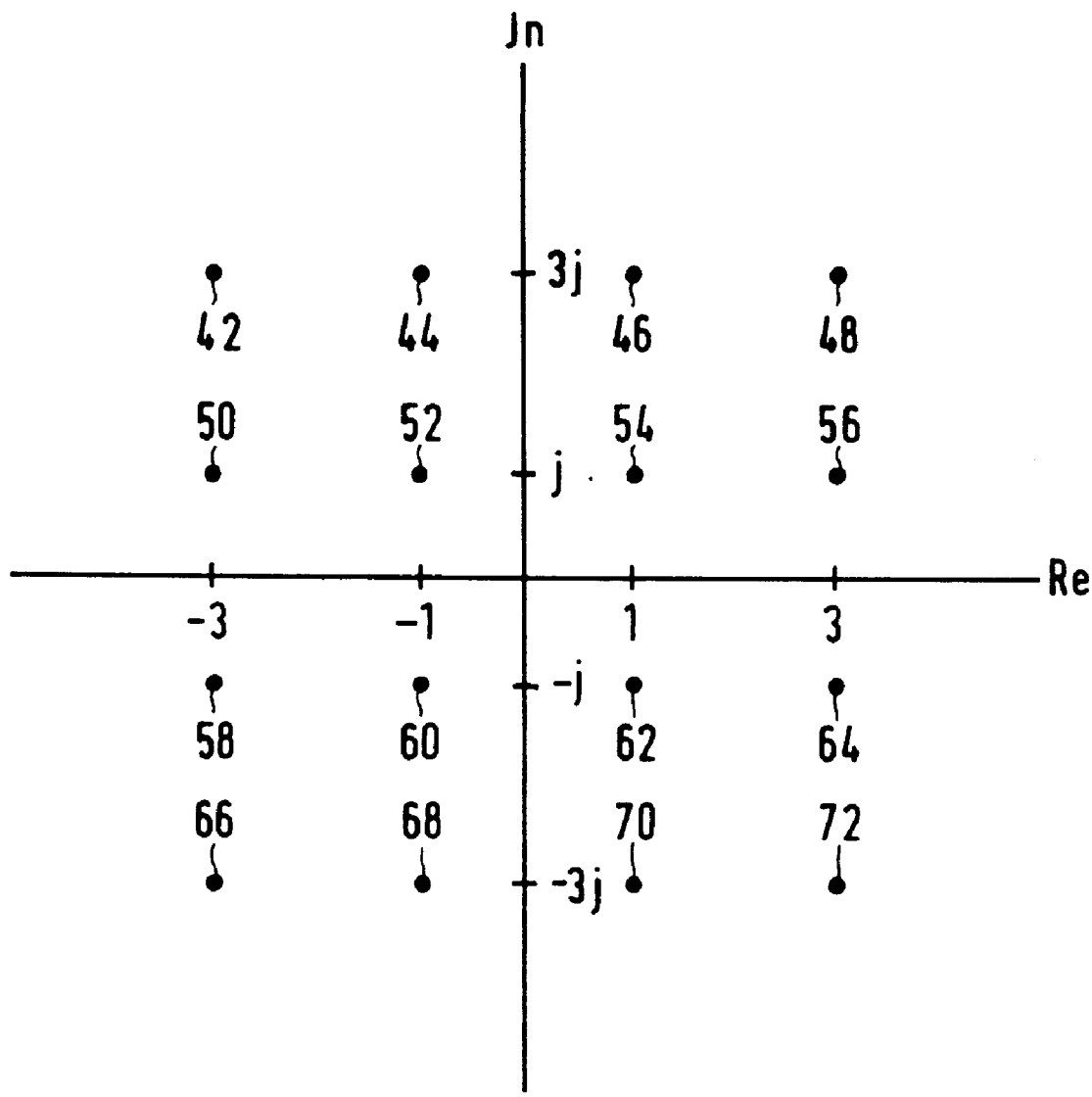
FIG. 5 is a 16-QAM constellation used in the invention.

FIG. 4 shows a maximum ANR for P(1)=0.1. For values of P(1) smaller than 0,1 the receiver noise dominates. The amplitude to noise ratio decreases with P(1) due to the increased bandwidth required. For values of P(1) larger than 0.1 the ANR decreases due to the rapidly increasing value of the noise like signal caused by distortion by the non-linear transmission medium FIG. 5 shows the constellation of a QAM signal which can be used with the invention. This is a kind of coded modulation. Four consecutive bits are mapped on two consecutive symbols according to the constellation of FIG. 5.

| $A_3$ | $A_2$ | $A_1$ | $A_0$ | $C_1$ | $C_2$ |
|---|---|---|---|---|---|
| 0 | 0 | 0 | 0 | 42 | 44 |
| 0 | 0 | 0 | 1 | 50 | 52 |
| 0 | 0 | 1 | 0 | 58 | 66 |
| 0 | 0 | 1 | 1 | 60 | 68 |
| 0 | 1 | 0 | 0 | 62 | 64 |
| 0 | 1 | 0 | 1 | 70 | 72 |
| 0 | 1 | 1 | 0 | 46 | 54 |
| 0 | 1 | 1 | 1 | 48 | 56 |
| 1 | 0 | 0 | 0 | 52 | 54 |
| 1 | 0 | 0 | 1 | 52 | 62 |
| 1 | 0 | 1 | 0 | 52 | 60 |
| 1 | 0 | 1 | 1 | 54 | 62 |
| 1 | 1 | 0 | 0 | 54 | 60 |
| 1 | 1 | 0 | 1 | 62 | 60 |
| 1 | 1 | 1 | 0 | 54 | 56 |
| 1 | 1 | 1 | 1 | 58 | 60 |

The rate of the code according to the above mentioned table is 0.5. The symbols $C_j$ can have the amplitude values $a\sqrt{2}$, $a\sqrt{10}$ and $3a\sqrt{2}$, $a$ being a constant. The probability of an amplitude of $a\sqrt{2}$ is equal to $18/32 = 9/16$, the probability of an amplitude value of $a\sqrt{10}$ is equal to $10/32 = 5/16$ and the probability of an amplitude value of $3a\sqrt{2} = 1/8$. Using these probabilities, the average square of the amplitude corresponding to the present code can be found:

$$< C^2 > = a^2 \frac{1}{8} \cdot 18 + a^2 \frac{5}{16} \cdot 10 + a^2 \frac{9}{16} \cdot 2 = 6.5 a^2$$

For uncoded QAM one can easily find:

$$< C^2 > = \frac{1}{4} \cdot 18a^2 + \frac{1}{2} 10a^2 + \frac{1}{4} 2a^2 = 10a^2$$

From the above mentioned calculations it is clear that due to the coding the average value of $<C^2>$ is substantially decreased.

What is claimed is:

1. A transmitter for use in a transmission system wherein a plurality of digital signals are transmitted over a non-linear transmission medium to one or more receivers, the digital signals being in the form of respective sequences of digital symbols; said transmitter comprising:

coding means for encoding the respective sequences of digital symbols so as to derive a plurality of sequences of encoded digital symbols;

modulating means coupled to said coding means for modulating respective carrier waves with the respective sequences of encoded digital symbols, thereby deriving a plurality of digitally modulated carrier waves; and combining means coupled to said modulating means for combining the plurality of digitally modulated carrier waves to thereby derive a combined wave which is supplied to said transmission medium for conveyance to said one or more receivers;

characterized in that said coding means encodes the respective sequences of digital symbols in accordance with a code such that (i) encoded digital symbols of higher probability of occurrence correspond to lower amplitudes of the digitally modulated carrier waves representative thereof, and (ii) an encoded digital symbol which corresponds to a maximum amplitude of the digitally modulated carrier wave representative thereof has a probability of occurrence which provides a maximum signal amplitude-to-noise ratio of said digitally modulated carrier wave;

the average amplitude of each of the digitally modulated carrier waves being reduced as a result of said encoding, thereby increasing the signal amplitude-to-noise ratio of each of said waves.

2. A transmission system for transmission of a plurality of digital signals from a transmitter to one or more receivers via a non-linear transmission medium, the digital signals being in the form of respective sequences of digital symbols; characterized in that:

said transmitter is a transmitter as claimed in claim 1; and said non-linear transmission medium comprises a cascade connection of an electro-optical converter, an optical transmission channel, and an opto-electrical converter.

3. A transmission system for transmission of a plurality of digital signals from a transmitter to one or more receivers via a non-linear transmission medium, the digital signals being in the form of respective sequences of digital symbols; characterized in that:

said transmitter is a transmitter as claimed in claim 1; and said non-linear transmission medium comprises a plurality of optical channel sections having respective inputs which are interconnected to a common output of at least one optical amplifier.

4. A receiver which is one of a plurality of receivers for use in a transmission system wherein a plurality of coded digital signals are transmitted over a non-linear transmission medium to each of said receivers, the coded digital signals being in the form of respective sequences of coded digital symbols which are transmitted by modulating respective carrier waves with the respective coded digital signals and combining the digitally modulated carrier waves to form a combined wave which is supplied to the transmission medium for conveyance to said receivers; said one receiver comprising:

selecting means for selecting a particular one of the digitally modulated carrier waves from a combined wave received from said transmission medium;

demodulating means coupled to said selecting means for recovering from the selected digitally modulated carrier wave a coded digital signal in the form of a sequence of coded digital symbols; and decoding means coupled to said demodulating means for decoding the recovered sequence of coded digital symbols to derive a corresponding sequence of decoded digital symbols, the decoding being in accordance with a code such that (i) coded digital symbols of higher probability of occurrence correspond to lower amplitudes of the digitally modulated carrier waves representative thereof, and (ii) an encoded digital symbol which corresponds to a maximum amplitude of the digitally modulated carrier wave representative thereof has a probability of occurrence which provides a maximum signal amplitude-to-noise ratio of said digitally modulated carrier wave;

the average amplitude of each of the digitally modulated carrier waves being reduced as a result of said encoding, thereby increasing the signal amplitude-to-noise ratio of each of said waves.

* * * * *